United States Patent

[11] 3,543,887

| [72] | Inventor | Harold Hodkinson |
| | | Warwickshire, England |
| [21] | Appl. No. | 778,066 |
| [22] | Filed | Nov. 22, 1968 |
| [45] | Patented | Dec. 1, 1970 |
| [73] | Assignee | Automotive Products Company Limited |
| | | Warwickshire, England |
| [32] | Priority | Dec. 1, 1967 |
| [33] | | Great Britain |
| [31] | | No. 54699/67 |

[54] CLOSED LOOP TYPE DISC BRAKE AND SUPPORT MEANS THEREFOR
8 Claims, 6 Drawing Figs.

[52] U.S. Cl. ..................................................... 188/73.4
[51] Int. Cl. ....................................................... F16d 65/02
[50] Field of Search ........................................... 188/73, 73(C), 73(CL)

[56] References Cited
UNITED STATES PATENTS

| 3,158,230 | 11/1964 | Chouings | 188/73(CL)UX |
| 3,245,500 | 4/1966 | Hambling et al | 188/73(CL)UX |
| 3,442,353 | 5/1969 | Harrison | 188/73 |

FOREIGN PATENTS

| 1,009,241 | 11/1965 | Great Britain | 188/73 |

Primary Examiner—George E. A. Halvosa
Attorney—Lawrence J. Winter

ABSTRACT: A disc brake in which a fixed supporting structure carrying a brake-actuating means provides support on both sides of the brake disc for a movable member of closed loop construction, the brake-actuation means including opposed operating members one acting directly on a brake pad on one side of the disc, and the other acting through the movable member on a brake pad on the other side of the disc.

CLOSED LOOP TYPE DISC BRAKE AND SUPPORT MEANS THEREFOR

The present invention relates to disk brakes of the kind in which brake-actuating means disposed on one side of the brake disk is operable to apply to the brake disk a brake pad on the same side of the brake disk as the actuating means, a brake pad on the other side of the brake disk being also applied to the brake disk by a movable member of closed loop construction which is disposed in a chordal plane of the brake disk and mounted so as to be capable of rectilinear sliding movement in said plane, such sliding movement resulting from operation of the brake-actuating means.

The object of the invention is to provide an improved construction of disc brake of the kind above referred to.

A disk brake according to the invention comprises a brake disk adapted for mounting to rotate with a wheel or other member the rotation of which is to be controlled by the brake, brake pads adapted to engage the said brake disk on opposite sides thereof, a supporting structure adapted for mounting on a fixed part of a vehicle structure at one side of the brake disk and carrying brake-actuating means at that side of the brake disk, a movable member of closed loop construction mounted so as to lie in a chordal plane of the brake disk and to be capable of sliding movement in said plane in the direction of the axis of rotation of the brake disk, said movable member having an opening to receive a peripheral portion of the brake disk and the brake pads, and support means for the movable member on or carried by the supporting structure and spaced apart from one another on opposite sides of the brake disk, the brake-actuating means having opposed operating members movable in opposite directions during a braking operation to cause one of said operating members to move towards the brake disk to apply to the brake disk the brake pad on the same side of the brake disk as the brake-actuating means and to cause the other operating member to move in a direction away from the brake disk to produce sliding movement of the movable member in a direction to bring the other brake pad into engagement with the brake disk.

Preferably, the support means for the movable member on the side of the brake disk remote from the brake-actuating means form a part of the supporting structure, and the support means for the movable member on the same side of the brake disk as the brake-actuating means are carried by the operating member which produces sliding movement of said movable member.

The invention is hereinafter described with reference to the accompanying drawings which show, by way of example, two embodiments of the invention. In the drawings.

Figure 1:
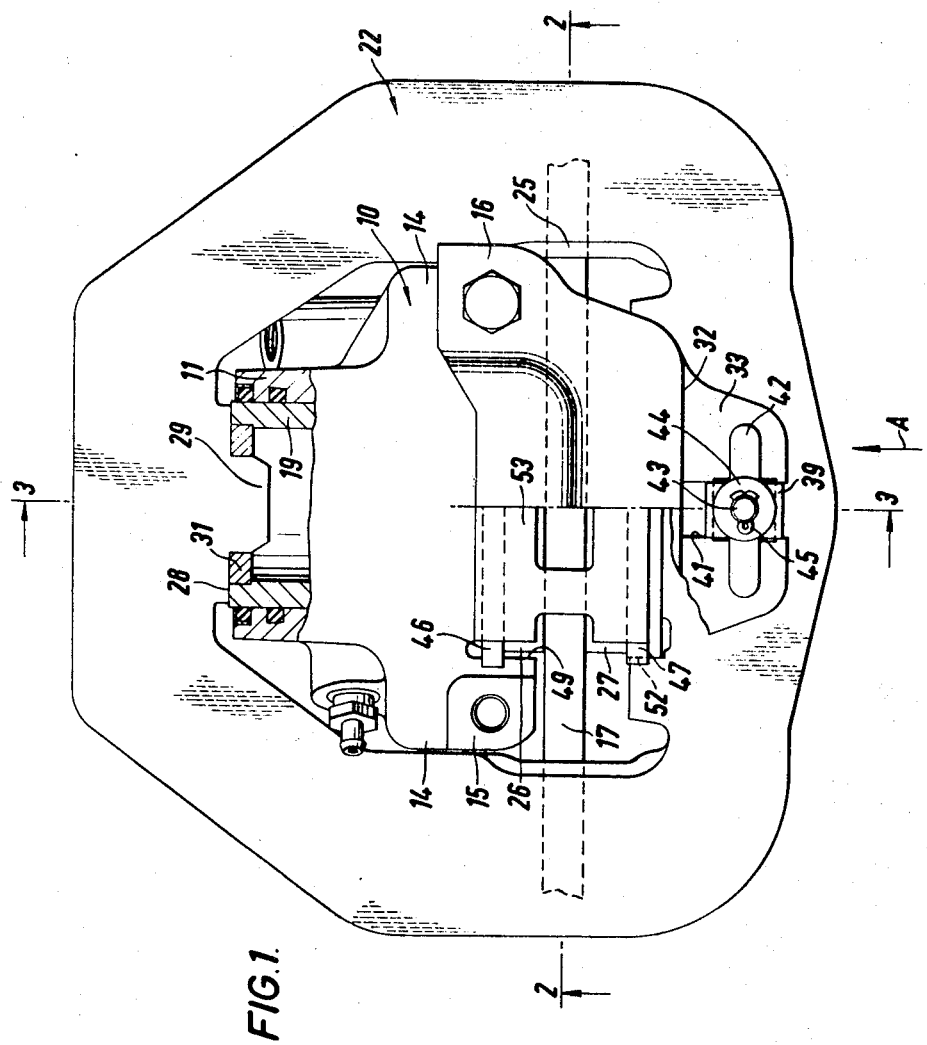
FIG. 1 is a plan view, with parts broken away and other parts in section, of one form of disk brake according to the invention.
Figure 2:
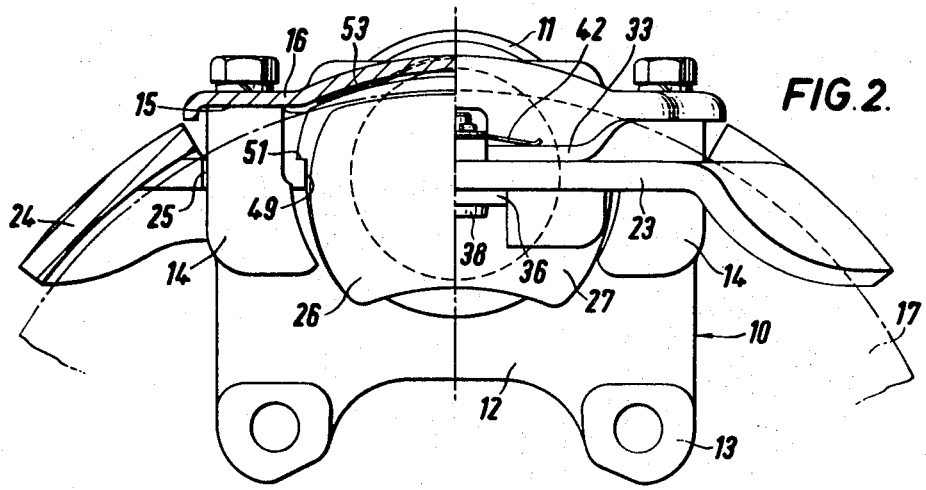
FIG. 2 is an elevation of the brake shown in FIG. 1, looking in the direction of the arrow A in FIG. 1, and partly in section on the line 2–2 of FIG. 1.
Figure 3:
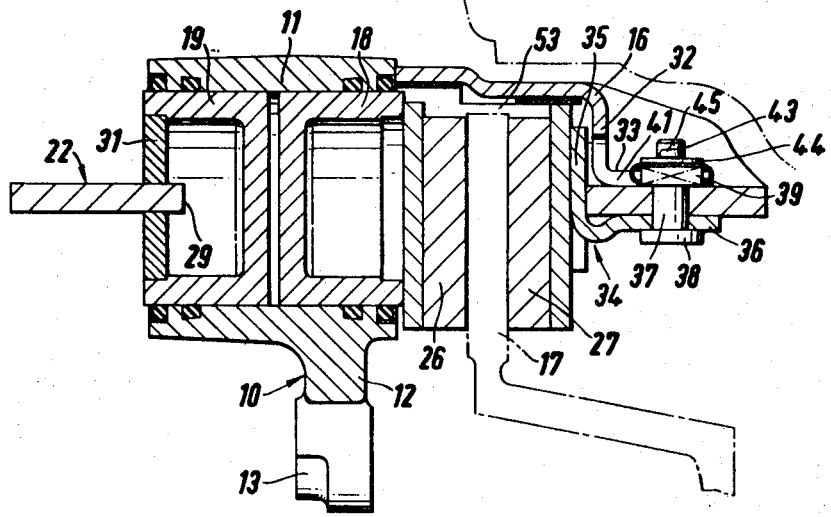
FIG. 3 is a section on the line 3–3 of FIG. 1.

Referring to FIGS. 1 to 3 of the drawings, a supporting structure 10 comprises a wheel cylinder 11 open at both ends and having integral with it a web 12, lying in a plane normal to the axis of the wheel cylinder, thickened portions 13 at two corners of the web being apertured to receive bolts or studs, not shown, for fixing the structure 10 to a fixed portion of a vehicle structure adjacent a wheel thereof. A pair of lugs 14 disposed at opposite ends of a diameter of the wheel cylinder 11, project beyond one end of the wheel cylinder as shown in FIG. 1. The lugs 14 are each formed with a flat face 15, the two faces 15 lying in a common plane parallel to the wheel cylinder axis and offset to one side of the said axis and a plate member 16 is secured by bolts to the lugs so as to rest against the said faces 15.

The vehicle wheel adjacent to which the structure 10 is mounted carries a brake disc 17, the wheel cylinder 11 and lugs 14 being positioned on one side of the said brake disk with the axis of the wheel cylinder parallel to the axis of rotation of the brake disk and at a distance from the said axis of rotation less than the radius of the brake disk. Two pistons 18 and 19 are slidably mounted in the bore of the wheel cylinder 11, the piston 18 in the end of the bore adjacent the brake disk being hereinafter referred to as the inner piston, whilst the piston 19 is referred to as the outer piston. A port, not shown, opening into the cylinder 11 between the pistons 18 and 19 is connectable to a source of liquid under pressure to urge the pistons 18 and 19 in opposite directions in the cylinder 11.

A movable member 22, in the form of a plate having a flat central portion 23 (FIG. 2) and end portions 24 which are deflected out of the plane of the central portion and curved as shown in FIG. 2, is mounted so that its flat central portion 23 lies in a chordal plane of the brake disk 17 and the said movable member is slidable in a direction parallel to the axis of rotation of the brake disk. The flat central portion 23 of the movable member is formed with an opening 25 shaped to receive a peripheral portion of the brake disk 17, brake pads 26 and 27 arranged one on each side of the brake disk 17, and the wheel cylinder 11, the centre of the thickness of the portion 23 of the member 22 lying substantially in a plane centering the axis of the wheel cylinder. The end of the outer piston 19 bears against an edge surface 28 (FIG. 1) of the opening 25 in the movable member 22 so that outward movement of that piston is transmitted to the movable member, and a tongue 29 projecting from the edge surface 28 engages in a diametral slot in a disc 31 mounted in the piston 19 so that the movable member is supported and located by the piston against movement in any direction other than the direction of movement of the piston.

The plate member 16 extends across the periphery of the brake disk 17 and the brake pads 26 and 27, and is cranked at 32 to provide a flat portion 33 in a plane parallel to the wheel cylinder axis and in contact with one side of the central portion 23 of the movable member, to provide a support for the said movable member 22 on the side of the brake disk remote from the wheel cylinder 11. An angle piece 34, one limb 35 of which projects through and engages an edge surface of the opening 25 in the movable member, has its other limb 36 lying against the side of the movable member opposite to that engaged by the flat portion 33 of the plate member 16, and a pin 37, having a head 38 engaging the limb 36 of the angle piece, passes through holes in the said angle piece and movable member and has located thereon a flat-sided bush 39 lying in a parallel-sided slot 41 in the flat portion 33 of the plate member 16, the slot extending in a direction parallel to the axis of the wheel cylinder 11. A blade spring 42, having an aperture at its centre through which a reduced diameter end portion 43 of the pin 37 passes engages at its ends with the surface of the flat portion 33 of the plate member 16, the spring being stressed by a washer 44 fitted on the pin and retained thereon by a split pin 45, so that the movable member is resiliently held against the flat portion 33. The bush 39 and slot 41 serve to guide the movable member for rectilinear movement in the direction of the wheel cylinder axis and to resist forces tending to move it in a direction transverse to that axis.

The brake pads 26 and 27 are carried respectively by metal backing plates 46 and 47, the backing plate 46 of the brake pad 26, which is disposed between the inner piston 18 of the wheel cylinder and the brake disk, being located between parallel guide surfaces on the lugs 14, one of which guide surfaces is shown at 49 in FIGS. 1 and 2 to hold it against movement circumferentially of the brake disk. and having outwardly projecting shoulders, one of which is shown at 51 in FIG. 2, resting on cooperating surfaces on the lugs 15 to support the pad 26 against radial inward movement. The backing plate 47 of the brake pad 27 is similarly located between edge surfaces 52 of the opening in the movable member 22, and is retained against radially inward movement by outwardly projecting shoulders engaging the surface of the movable member. The backing plate 47 bears against the limb 35 of the angle piece 34. A blade spring 53 mounted between the brake pads 26, 27 and the plate member 16, holds the said pads against radial outward movement.

In operation, the admission of liquid under pressure to the wheel cylinder 11 urges the pistons 18 and 19 in opposite directions, the piston 18 acting directly on the brake pad 26 to urge it against the brake disk 17, and the pistons 19 acting on the movable member 22 to produce sliding movement thereof, so that the brake pad 26 is also urged against the brake disk. Owing to the relatively wide spacing of the positions at which the movable member is supported, any tendency for it to tilt in a direction transverse to the plane of the brake disk is eliminated or very greatly reduced.

In the arrangement just described, the torque reaction on the brake pad 26 due to the drag of the brake disk is taken directly by the support structure 10, which the torque reaction on the brake pad 27 is transmitted to the movable member 22 and through the pin 37 and bush 39 to the plate member 16. This, however, is not an essential feature of the invention, and the brake can be modified so that the torque reaction from both pads is taken by the movable member or the torque reaction from both pads is taken by the supporting structure. The brake pads may be supported against radial inward and/or outward movement by means other than those described.

Figure 4:
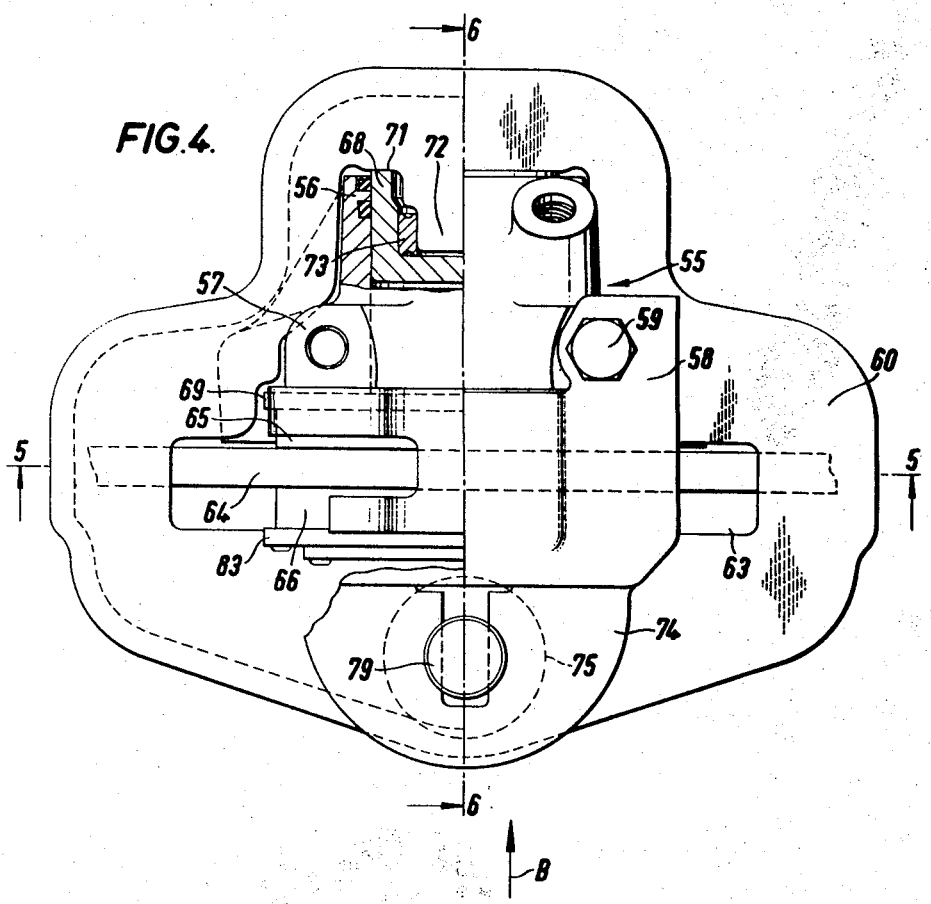
FIG. 4 is a plan view, similar to FIG. 1, showing another form of disk brake according to the invention.
Figure 5:
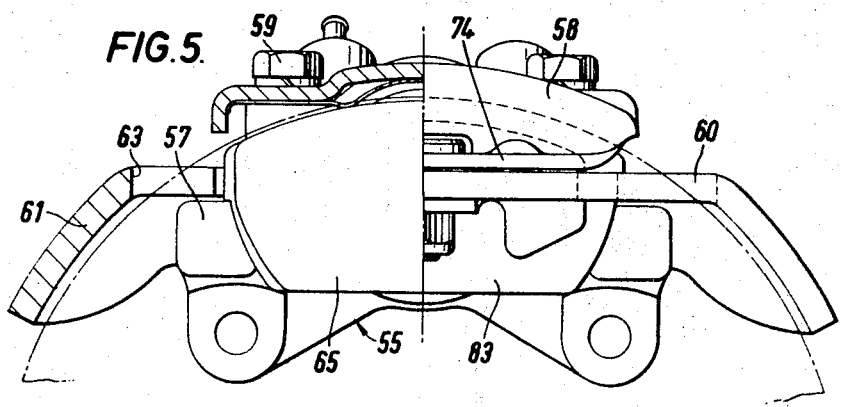
FIG. 5 is a section, partly in elevation, of the brake shown in FIG. 4, looking in the direction of the arrow B in FIG. 4 and partly in section on the line 5–5 of FIG. 4.
Figure 6:
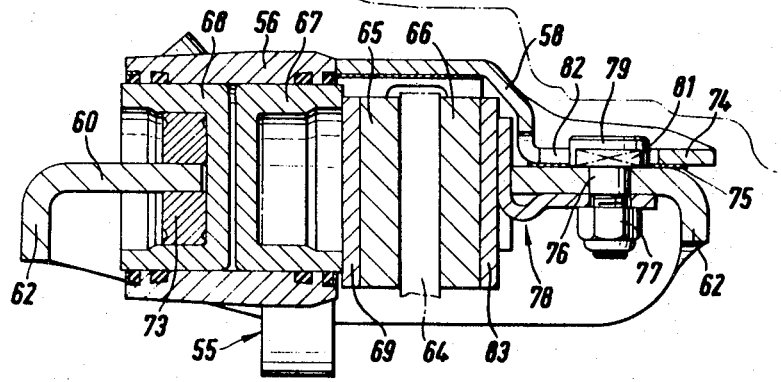
FIG. 6 is a section on the line 6–6 of FIG. 4.

The embodiment of the invention shown in FIGS. 4 to 6 of the drawings is similar in many respects to that described with reference to FIGS. 1 to 3. A supporting structure 55 similar to the supporting structure 10 shown in FIGS. 1 to 3 includes a wheel cylinder 56 and lugs 57, and a plate member 58, similar to the plate member 16, is fixed to the lugs 57 by bolts 59. A movable member 60, having, in addition to curved end portions 61 similar to the end portions of the movable member 22 shown in FIGS. 1 to 3, flanges 62 at its side edges to further increase its rigidity. An opening 63 in the movable member receives a peripheral portion of a brake disk 64, brake pads 65 and 66 one on each side of the brake disk, and the wheel cylinder 56. The wheel cylinder has mounted in it inner and outer pistons 67 and 68, the inner piston 67 engaging a backing plate 69 on the brake pad 65, and the outer piston 68 engaging on edge surface 71 of the opening in the movable member. A tongue 72 extending into the opening from said edge surface 71 is engaged in a slot in a bush 73 mounted in the outer piston 68.

The plate member 58 has a flat portion 74 to support the movable member 60 on the side of the brake disc remote from the wheel cylinder 56, a dished resilient washer 75 being positioned between the said flat portion 74 and the movable member 60, and a bolt 76, having a head engaging the flat portion 74, passes through a hole in the movable member and is held in position by a nut 77, an angle piece 78 similar to the angle piece 34 being also held in position by said nut and bolt. The head 79 of the bolt 76 has a pair of opposed flats 81 extending over only a part of the thickness of said head, the part of the head on which the flats 81 are formed being engaged in a slot 82 in the flat portion 74 to guide the movable member for sliding movement relative to the supporting structure.

A backing plate 83 on the brake pad 68 is engaged by the angle piece 78 to transmit to that brake pad from the movable member the thrust exerted on the said movable member by the outer piston 68. The backing plates 69 and 83 are located, and supported against the torque reaction, in the manner described with reference to FIGS. 1 to 3, but, as already stated, they may be arranged so that the torque reaction of both pads is taken by the supporting structure or by the movable member instead of the said torque reaction of one being taken by the supporting structure and the torque reaction of the other being taken by the movable member.

I claim:

1. A disk brake assembly comprising a brake disc, a fixed support member positioned on one side of said brake disc with a cylinder disposed thereon, a pair of pistons disposed in said cylinder comprising inner and outer pistons movable in opposite directions, a first brake pad secured to said inner piston and adapted to engage one side of said brake disk, a movable slidable member forming a closed loop rigidly secured to said outer piston for movement thereby, said loop having a central opening therein perpendicular to the plane of rotation of the brake disk with the brake disk extending into said opening, a second brake pad carried by the opposite side of said loop disposed away from said fixed support adapted to engage the opposite side of said brake disk, a portion of said fixed support extending to the opposite side of said brake disk opposite said cylinder and means on said opposite side of said loop slidably connecting said loop to said fixed support portion to permit said loop to slide in a rectilinear direction with respect to the axis of said cylinder, said slidably connecting means including pin means passing through hole means in said fixed portion and said loop with said hole means having at least one elongated hole and resilient means holding said connecting means in slidable relationship, and piston-actuating means operatively connected to said pistons to force said brake pads against said brake disc.

2. A disk brake according to claim 7, wherein said portion includes a plate member detachably secured to said fixed support.

3. A disk brake according to claim 1, wherein the movable member is supported in sliding relation to the supporting means therefor on the side of the brake disk remote from the cylinder by a pin passing through said movable member and in an elongated slot in said portion.

4. A disk brake according to claim 1, wherein the outer piston producing sliding movement of the movable member carries a slotted disk, a tongue on the movable member engaging in the slot in the disk to provide support means for said movable member.

5. A disk brake according to claim 1, wherein abutments are provided to support at least one of the brake pads against torque reaction during rotation of the brake disk with the brake applied.

6. A disk brake according to claim 5, wherein abutments to support the brake pad on the same side of the brake disk as the brake applying means against the said torque reaction are provided on the fixed supporting structure, and abutments to support the other brake pad against the said torque reaction are provided on the movable member.

7. A disk brake according to claim 6, wherein the movable member includes a flat central portion and curved end portions deflected out of the plane of said central portion.

8. A disk brake according to claim 7, wherein the movable member is provided with flanges along its side edges.